United States Patent
Chou et al.

(10) Patent No.: US 11,275,864 B2
(45) Date of Patent: Mar. 15, 2022

(54) PERSONAL PRIVACY PROTOCOLS FOR SHARING MEDIA ON SOCIAL MEDIA PLATFORMS

(71) Applicant: International Business Machines Corporation, Armonk, NY (US)

(72) Inventors: Kuo-Liang Chou, Taipei (TW); Kate Lin, Tainan (TW); Peter Wu, New Taipei (TW); I-Chien Lin, Taipei (TW); Chiwen Chang, Taipei (TW); Ci-Wei Lan, Keelung (TW); Tsai-Hsuan Hsieh, Taoyuan (TW)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 16/111,690

(22) Filed: Aug. 24, 2018

(65) Prior Publication Data
US 2020/0065512 A1 Feb. 27, 2020

(51) Int. Cl.
*G06F 21/62* (2013.01)
*G06F 21/60* (2013.01)
*H04L 29/06* (2006.01)

(52) U.S. Cl.
CPC ........ *G06F 21/6245* (2013.01); *G06F 21/602* (2013.01); *H04L 63/0428* (2013.01)

(58) Field of Classification Search
CPC ............... G06F 21/6245; G06F 21/602; H04L 63/0428; H04L 51/12; H04L 63/0407; H04L 63/06
See application file for complete search history.

(56) References Cited

U.S. PATENT DOCUMENTS

| 8,744,143 B2 | 6/2014 | Chen |
| 8,768,693 B2 | 7/2014 | Somekh et al. |
| 8,923,647 B2 | 12/2014 | Kothari |

(Continued)

FOREIGN PATENT DOCUMENTS

WO  WO2016026944  2/2016

OTHER PUBLICATIONS

Aditya, I-Pic:A Platfrom for Privacy-Compliant Image Capture, ACM, MobiSys '16: Proceedings of the 14th Annual International Conference on Mobile Systems, Applications and Services, Jun. 2016, pp. 235-248 (Year: 2016).*

(Continued)

*Primary Examiner* — Robert B Leung
*Assistant Examiner* — Bruce S Ashley
(74) *Attorney, Agent, or Firm* — Schmeiser, Olsen & Watts, LLP; Stephanie Carusillo

(57) ABSTRACT

A system and method for privacy identity control for sharing media on a social media platform includes receiving a digital image encoded with a privacy identification data from a media capturing device for sharing on the social media platform, retrieving a first key based on the privacy identification data for decrypting an encrypted personal privacy protocol, wherein the personal privacy protocol is encrypted using a second key, decrypting the encrypted personal privacy protocol using the first key to obtain a decrypted personal privacy protocol, and displaying the digital image on the social media platform based on the decrypted personal privacy protocol.

20 Claims, 12 Drawing Sheets

(56) References Cited

U.S. PATENT DOCUMENTS

| | | | |
|---|---|---|---|
| 2005/0039031 A1* | 2/2005 | Mont | H04L 9/083 |
| | | | 713/189 |
| 2008/0204237 A1 | 8/2008 | Levin | |
| 2015/0186672 A1 | 7/2015 | Schillings et al. | |
| 2015/0242638 A1* | 8/2015 | Bitran | G06F 21/6245 |
| | | | 726/26 |
| 2017/0078255 A1* | 3/2017 | Nejadian | H04L 63/06 |
| 2017/0085385 A1* | 3/2017 | Kilduff | H04L 63/06 |
| 2018/0046814 A1* | 2/2018 | Manoharan | G06F 21/6209 |

OTHER PUBLICATIONS

Yuan et al., Privacy-Preserving Photo Sharing Based on a Secure JPEG, Retrieved from Internet: URL: https://infoscience.epfl.ch/record/205859/files/BigSecurity_2015_ProShare.pdf, 6 pages.

Aditya et al., I-PIC: A Platform for Privacy-Compliant Image Capture, Retrieved from Internet: URL: https://scalable.mpi-inf.mpg.de/files/2016/05/ipic-mobisys2016.pdf, 14 pages.

Mell, Peter et al.; "The NIST Definition of Cloud Computing;" National Institute of Standards and Technology; Special Publication 800-145; Sep. 2011; 7 pages.

* cited by examiner

PERSONAL PRIVACY PROTOCOLS FOR SHARING MEDIA ON SOCIAL MEDIA PLATFORMS

TECHNICAL FIELD

The present invention relates to systems and methods for privacy control on social media, and more specifically the embodiments of a privacy control system for privacy identity control for sharing media on a social media platform.

BACKGROUND

In social settings, people enjoy taking photographs. The photographs are often shared on various social media platforms with no privacy restrictions for the individuals in the picture who are not uploading the photograph. For instance, a user can take a photograph of several individuals, post the photograph on a social media platform, and then tag the individuals without authorization from the individuals in the photograph. Some individuals present in the photograph would prefer not be tagged in the photographs uploaded to the social media platform, but find it difficult to refuse to be a part of the photograph.

SUMMARY

An embodiment of the present invention relates to a method, and associated computer system and computer program product for privacy identity control for sharing media on a social media platform. A processor of a computing system receives a digital image encoded with a privacy identification data from a media capturing device for sharing on the social media platform. A first key is retrieved based on the privacy identification data for decrypting an encrypted personal privacy protocol, wherein the personal privacy protocol is encrypted using a second key. The encrypted personal privacy protocol is decrypted using the first key to obtain a decrypted personal privacy protocol. The digital image is displayed on the social media platform based on the decrypted personal privacy protocol

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 1:
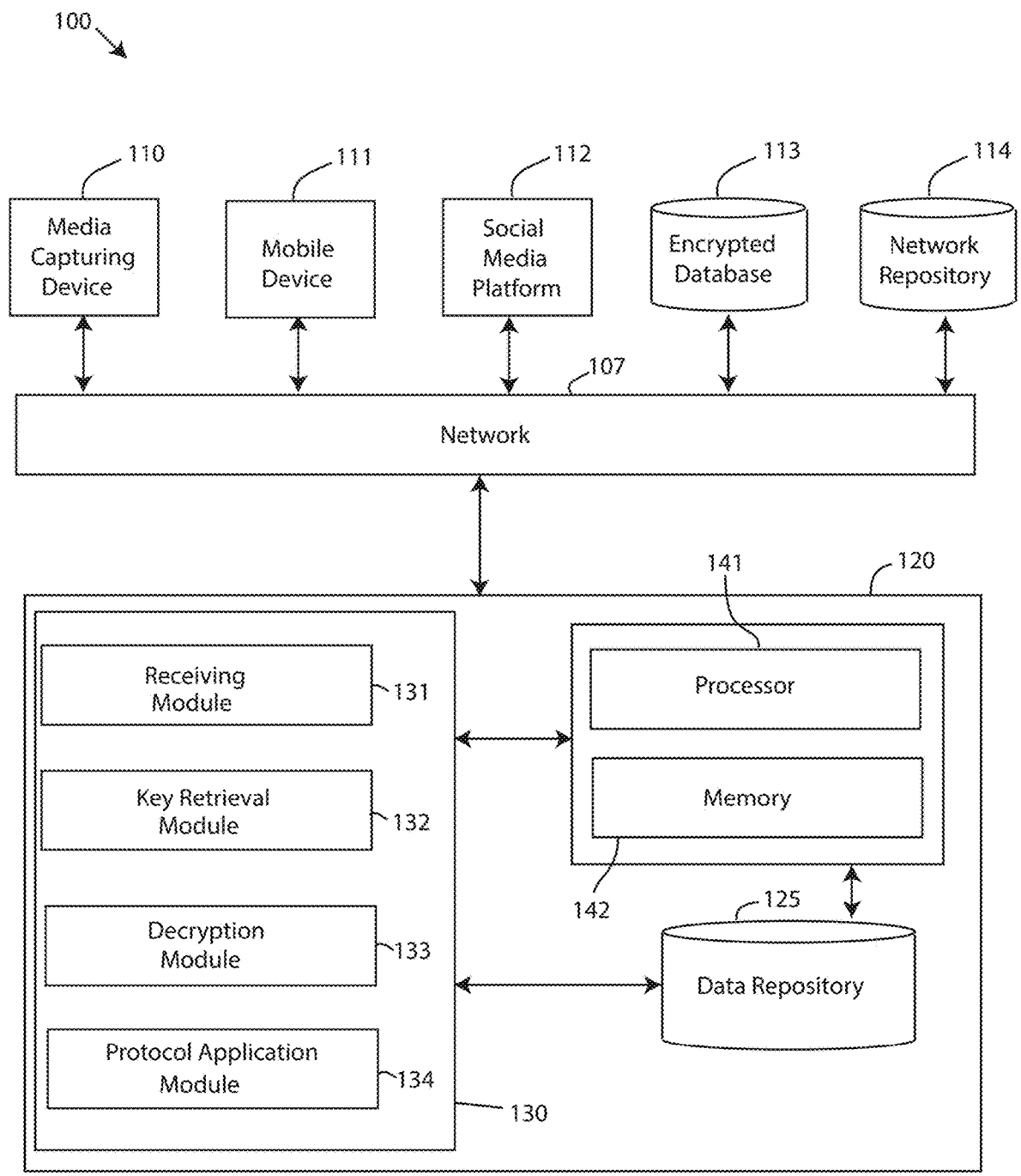
FIG. 1 depicts a block diagram of a privacy control system, in accordance with embodiments of the present invention.

Referring to the drawings, FIG. 1 depicts a block diagram of a privacy control system 100, in accordance with embodiments of the present invention. Embodiments of the privacy control system 100 may be a system for privacy identity control for sharing media on a social media platform. The privacy control system 100 applies a personal privacy protocol specific to a user before displaying a digital image of the user on a social media platform. For example, the privacy control system 100 locates an encrypted personal privacy protocol in response to a digital image being uploaded to the social media platform. The encrypted privacy protocol is decrypted with a pair of cryptographic keys retrieved based on personal identification data broadcasted from the user's mobile device to a media capturing device that is capturing the digital image. The media capturing device encodes the digital image data with the personal identification data, which is then used to retrieve the necessary key to decrypt and use the personal privacy protocol. Prior to displaying the digital image, the privacy control system 100 applies the personal privacy protocol to determine whether the user can be tagged in the digital image, identified in the digital image, or other sharing and tagging functions available on social media platforms.

Embodiments of the privacy control system 100 may be a privacy protocol system, a photograph sharing modification system, a social media privacy tool, and the like. The privacy control system 100 includes a computing system 120. Embodiments of the computing system 120 may be a computer system, a computer, a server, one or more servers, a backend computing system, and the like.

Furthermore, the privacy control system 100 includes a media capturing device 110, a user mobile device 111, a social media platform 112, and an encrypted database 113, which are communicatively coupled to the computing system 120 over a network 107. For instance, information/data is transmitted to and/or received from the media capturing device 110, the user media device 111, the social media platform 112, and the encrypted database 113 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 further comprises, in addition to the computing system 120, a connection to one or more network-accessible knowledge bases 114, which are network repositories containing information relating to privacy protocol, user privacy preferences, privacy rules, location information, event information, personal information, etc., network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 are a data collection area on the network 107 which backs up and saves all the data transmitted back and forth between the nodes of the network 107. For example, the network repository may be a data center saving and cataloging, privacy protocol, user privacy preferences, privacy rules, location information, event information, personal information, and the like, to generate both historical and predictive reports regarding a particular user privacy protocol or photograph sharing sequence. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 are a local repository that is connected to the computing system 120.

Embodiments of the media capturing device 110 may be a computing device, a computer, a cell phone, a digital camera, a mobile computing device, a tablet computer, a laptop computer, a wearable computing device, a smartwatch, an augmented reality device, and the like, which is used to capture media, such as a digital image, and to interact with social media websites and channels to upload the media on the social media platform 112. The media capturing device 110 includes hardware functionality such as a camera for capturing digital images and videos, a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like. Similarly, the user mobile device 111 is also a computing device, a computer, a digital camera, a cell phone, a mobile computing device, a tablet computer, a laptop computer, a wearable computing device, a smartwatch, an augmented reality device, and the like, which broadcasts a signal to the media capturing device 110 containing personal identification data associated with the user, as described in greater detail infra. The user mobile device 111 can include the same hardware functionality as the media capturing device 110. Although a single mobile device 111 is depicted in FIG. 1, the privacy control system 100 includes a plurality of user mobile devices.

Referring still to FIG. 1, the privacy control system 100 includes a social media platform system 112. The social media platform 112 is communicatively coupled to the computing system 120 over network 107. Embodiments of the social media platform 112 may be a network, a computing system, a network of computers, a plurality of computers, databases, networks, one or more databases, storage devices, repositories, servers, computers, engines, and the like, that may service, run, store or otherwise contain information and/or data regarding a social media network of a user and the user's social contacts and cohorts. The social media platform 112 is accessed or may share a communication link over network 107, and can be managed and/or controlled by a third party, such as a social media company. In an exemplary embodiment, the social media platform 112 is a social media network, social media website, social media channel, social media mobile application, a social media engine, and the like, which stores or otherwise contains content posted by users.

Embodiments of the privacy control system 100 include an encrypted database 113. The encrypted database is a computer readable storage device communicatively coupled to the computing system 120. In one embodiment, the encrypted database 113 is coupled to the computing system 120, as shown in FIG. 1. In another embodiment, the encrypted database 113 is local to the computing system 120. Embodiments of encrypted database 113 may be a database or physical server system that stores encrypted personal privacy protocols for a plurality of users.

Figure 2:
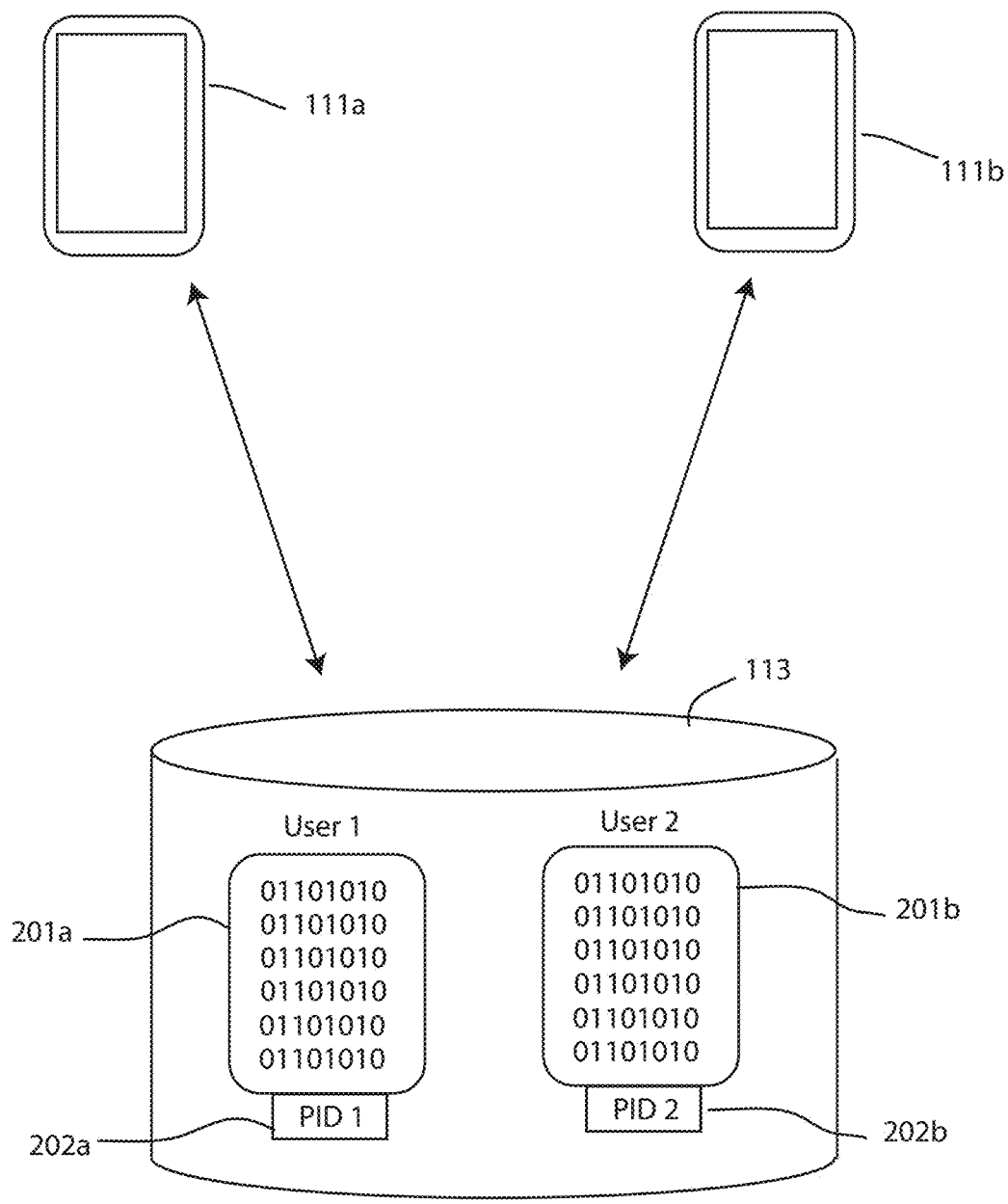
FIG. 2 depicts a schematic diagram of the encrypted database storing personal privacy protocols of a plurality of users along with personal identification data (PID), in accordance with embodiments of the present invention.

FIG. 2 depicts a schematic diagram of the encrypted database 113 storing personal privacy protocols of a plurality of users along with personal identification data (PID), in accordance with embodiments of the present invention. Mobile device 111a is associated with User 1 and mobile device 111b is associated with User 2. The mobile devices 111a, 111b are used to configure and create a personal privacy protocol 201a and a personal privacy protocol 201b, respectively. The personal privacy protocols 201a, 201b each include one or more rules configured by User 1 and User 2, respectively, to govern a displaying of the digital image with respect to User 1 and User 2 on the social media platform 112. For instance, a user operating a software application of the mobile device 111 can configure, create, enter, and update one or more rules regarding privacy controls of a digital image containing the user's image, which is stored in the encrypted database 113 coupled to the computing system 120. The one or more rules include at least one of: an approval to be tagged in the digital image, a denial to be tagged in the digital image, a period of time that allows tagging in the digital image, an approval to be tagged at a certain event, a denial to be tagged at the certain event, an approval to be tagged on other social media platforms, and a denial to be tagged on another social media platform.

The personal privacy protocols 201a, 201b are encrypted with a cryptographic key known to the computing system 120 and stored in the encrypted database 113 alongside the encrypted personal privacy protocol. Additionally, personal identification data is linked with the personal privacy protocols in the encrypted database 113. As shown, personal identification data for User 1 (PID 1) is linked with the personal privacy protocol 201a and personal identification data for User 2 is linked with the personal privacy protocol 201b. The personal identification data is data/metadata used to locate a corresponding cryptographic key used to decrypt the encrypted personal privacy protocols. After the user configures and saves the user's specific personal privacy protocol, the personal identification data is loaded onto the user mobile 110 for broadcasting to media capturing devices 110. In the embodiment shown, PID 1 is loaded onto mobile device 111a associated with User 1 and PID 2 is loaded onto the mobile device 111b associated with User 2.

Furthermore, the computing system 120 of the privacy control system 100 is equipped with a memory device 142 which stores various data/information/code, and a processor 141 for implementing the tasks associated with the privacy control system 100. A privacy control application 130 is loaded in the memory device 142 of the computing system 120. The privacy control application 130 may be an interface, an application, a program, a module, or a combination of modules. In an exemplary embodiment, the privacy control application 130 is a software application running on one or more back end servers, servicing one or more media capturing devices 110 and user mobile devices 111, wherein a user interface portion of the software application (e.g. a social media platform software application) may also run on the media capturing device 110 and the user mobile device 111.

The privacy control application 130 of the computing system 120 includes a receiving module 131, a key retrieval module 132, a decryption module 133, and a protocol application module 134. A "module" refers to a hardware-based module, software-based module or a module that is a combination of hardware and software. Embodiments of hardware-based modules include self-contained components such as chipsets, specialized circuitry and one or more memory devices, while a software-based module is part of a program code or linked to the program code containing specific programmed instructions, which is loaded in the memory device of the computing system 120. A module (whether hardware, software, or a combination thereof) is designed to implement or execute one or more particular functions or routines.

Embodiments of the receiving module 131 include one or more components of hardware and/or software program code for receiving a digital image (e.g. a photograph of one or more users) encoded with a privacy identification data from a media capturing device 110 for sharing on the social media platform 112. The encoded digital image is captured by the media capturing device 110 and uploaded to the social media platform 112 for sharing and/or tagging. As part of the capturing of the digital image, user mobile devices 111 each broadcast a signal containing the privacy identification data to the media capturing device, which is received by a receiver of the media capturing device 110 as the digital image is captured. The signal is embedded with URL addressing a host of the personal privacy protocols. In one embodiment, the signal is 2D barcode. The user mobile devices 111 may continuously broadcast the signal or may enable the broadcasting (e.g. enabling the broadcasting through the software application) just prior to the photograph being taken. The digital image is encoded with the privacy identification data by the media capturing device 110 in response to capturing the digital image and receiving the signal containing the privacy identification data. The media capturing device 110 may store the encoded digital image locally or on a cloud service associated with the media capturing device 110 as an image file.

Figure 3:
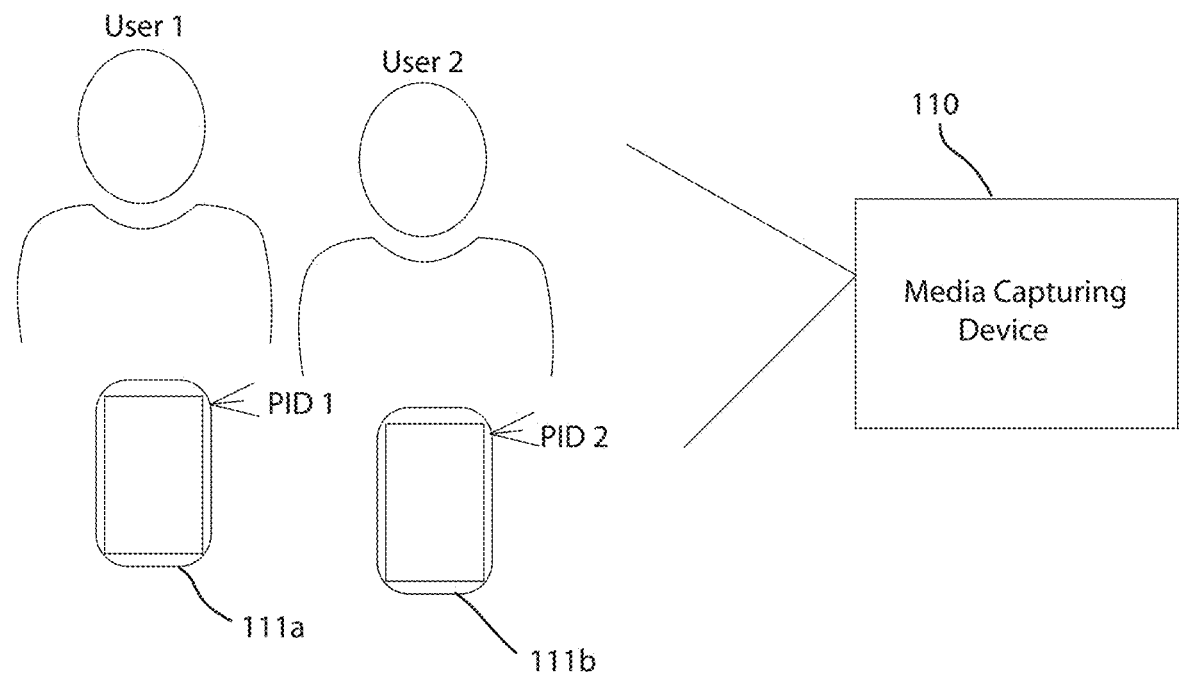
FIG. 3 depicts a schematic diagram of a media capturing device capturing a digital image of User 1 and User 2, in accordance with embodiments of the present invention.

FIG. 3 depicts a schematic diagram of a media capturing device capturing a digital image of User 1 and User 2, in accordance with embodiments of the present invention. The media capturing device 110 is taking a photograph of User 1 and User 2. The mobile device 111a associated with user 1 is broadcasting a signal containing PID 1 to the media capturing device 110. Similarly, the mobile device 111b associated with User 2 is broadcasting a signal containing PID 2 to the media capturing device 110. The broadcasted signals containing PID 1 and PID 2 are each received by media capturing device 110 as the digital image is captured. PID 1 and PID 2 are then encoded to the digital image by the media capturing device 110.

Figure 4:
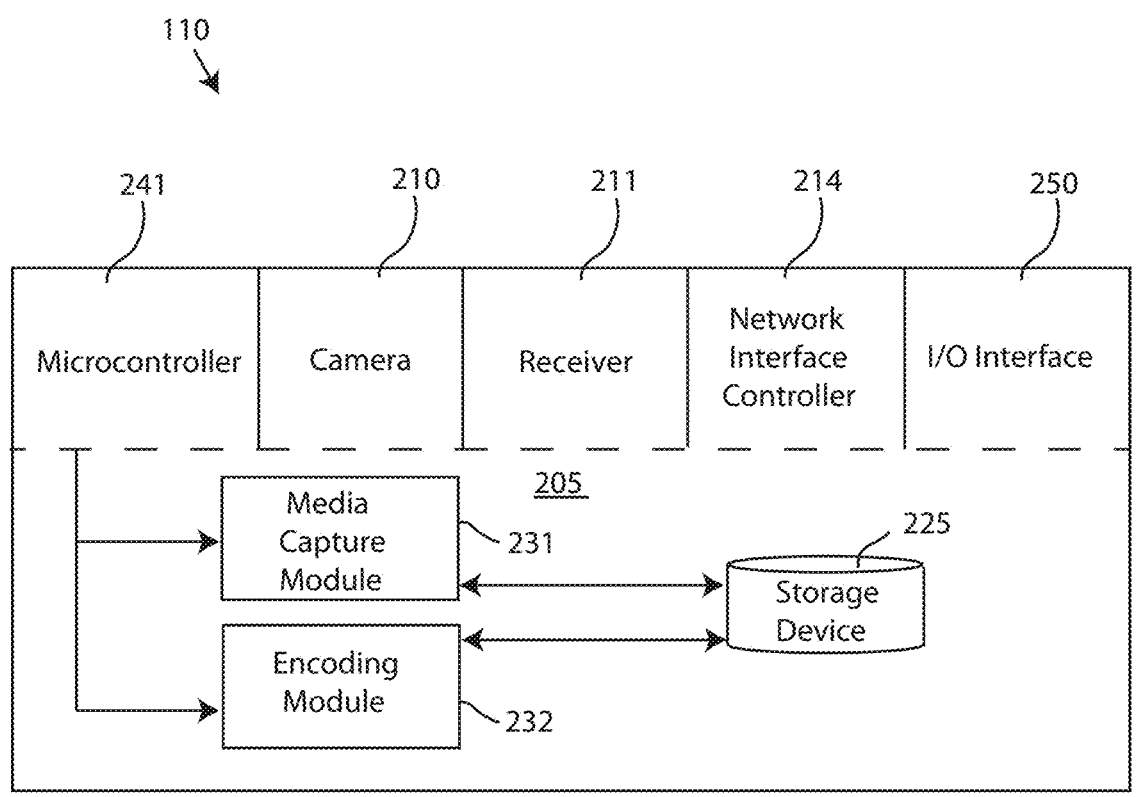
FIG. 4 depicts a block diagram of a media capturing device, which is part of the privacy control system of FIG. 1, in accordance with embodiments of the present invention.

FIG. 4 depicts a block diagram of a media capturing device 110, which is part of the privacy control system of FIG. 1, in accordance with embodiments of the present invention. The media capturing device 110 includes hardware and software components. For instance, the media capturing device 110 includes hardware components such as a microcontroller 241, camera 210, receiver 211, network interface controller 214, and an I/O interface 250. Software components of the media capturing device 110 are located in a memory system 205 of the media capturing device 110. The media capturing device 110 includes a microcontroller 241 for implementing the tasks associated with the media capturing device 110. The media capturing device 110 also includes a camera 210. The camera 210 may be a camera, an image recognition system, one or more cameras, and the like, associated with a camera application loaded on the media capturing device 110. The camera 210 is the hardware used to capture the digital images for eventual displaying on the social media platform 112. The media capturing device 100 further includes a receiver for receiving the broadcasted signal containing the personal identification data as the camera 210 is capturing the digital image data.

The media capturing device 110 includes a network interface controller 214, which is a hardware component of the media capturing device 110 that connects the media capturing device 110 to network 107 to interact with the social media platform 112. The network interface controller transmits and receives data, including the transmission of digital data acquired, collected, captured, or otherwise obtained by the media capturing device 110. In some embodiments, the encoded digital data is stored in storage device 225 of memory system 205 of the media capturing device 110. The network interface controller 214 accesses the storage device 225 and transmits the digital data over the network 107 to the computing system 120. Additionally, the media capturing device 110 includes an I/O interface 250. An I/O interface 250 refers to any communication process performed between the media capturing device 110 and the environment outside of the media capturing device 110. Input to the media capturing device 110 refers to the signals or instructions sent to the media capturing device 110, while output refers to the signals sent out from the media capturing device 110.

Furthermore, embodiments of the memory system 205 of the media capturing device 110 include a media capture module 231 and an encoding module 232. A "module" refers to a hardware based module, a software based module, or a module that is a combination of hardware and software. The hardware based modules include self-contained components such as chipsets, specialized circuitry and one or more memory devices, while software-based modules are a part of a program code or linked to the program code containing specific programmed instructions, which are loaded in the memory system 205 of the media capturing device 110. A module (whether hardware, software, or a combination thereof) is designed to implement or execute one or more particular functions or routines.

Embodiments of the media capture module 231 include one or more components of hardware and/or software program code for capturing digital data. The media capture module 231 captures digital image data using the camera 210 and associated camera application of the media capturing device 110. Embodiments of the encoding module 232 include one or more components of hardware and/or software program code for encoding the digital data/image with the privacy identification data. The encoding module 232 encodes the digital image with the privacy identification data in response to capturing the digital image and receiving the signal containing the privacy identification data.

Figure 5:
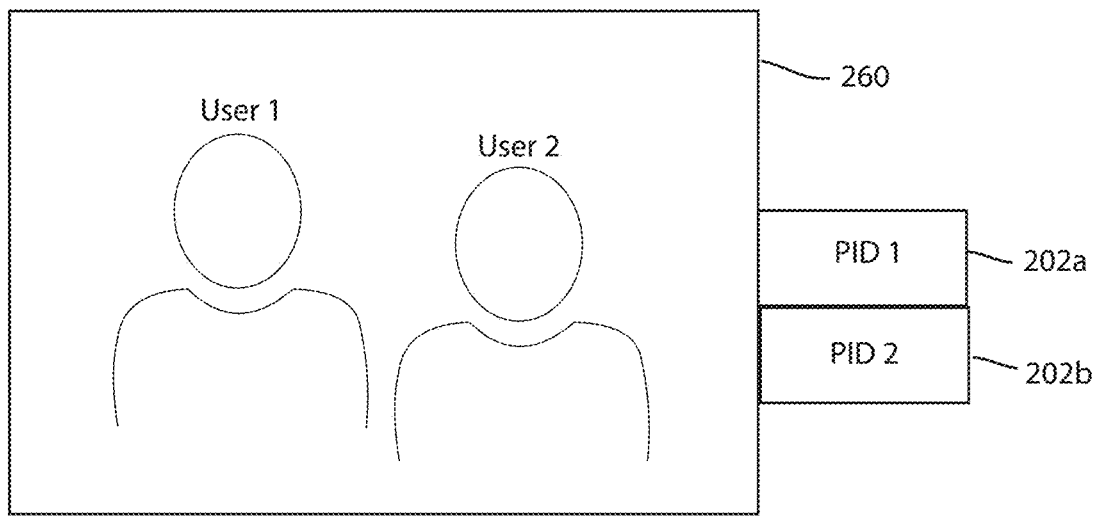
FIG. 5 depicts a schematic diagram of a digital image encoded with PID 1 and PID 2, in accordance with embodiments of the present invention.

FIG. 5 depicts a schematic diagram of a digital image 260 encoded with PID 1 202a and PID 2 202b, in accordance with embodiments of the present invention. The digital image 260 is stored by the media capturing device 110, either locally or on the cloud. Both User 1 and User 2 appear unaltered in the digital image 260. The media capturing device 110 is configured to upload the digital image 260 to the computing system 120 for application of the personal privacy protocols 201a and 201b, respectively.

Figure 6:
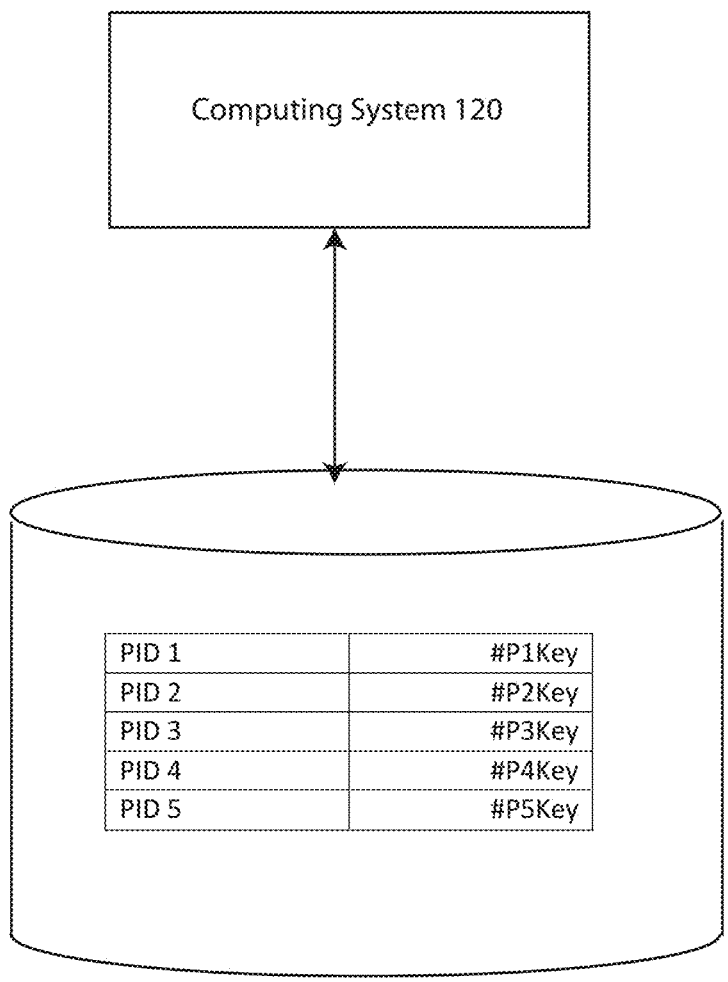
FIG. 6 depicts a schematic diagram of the key mapping database, in accordance with embodiments of the present invention.

Referring back to FIG. 1, the receiving module 131 of the privacy control application 130 receives the digital image encoded with the privacy identification data from the media capturing device 110. The key retrieval module 132 includes one or more components of hardware and/or software program code for retrieving a cryptographic key (i.e. a first key) based on the privacy identification data. The cryptographic key is used for decrypting an encrypted personal privacy protocol stored on the encrypted database 113, which is encrypted by a cryptographic key (i.e. a second key) that corresponds to the cryptographic key retrieved using the privacy identification data. For instance, the key retrieval module 132 retrieves the first key from a key mapping database that maps cryptographic keys with privacy identification data for a plurality of users. The key mapping database is a computer readable storage medium coupled to the computing system 120 that includes a database table for locating the specific cryptographic keys using the privacy identification data broadcasted by a specific user mobile device. FIG. 6 depicts a schematic diagram of the key mapping database, in accordance with embodiments of the present invention. The cryptographic keys used for decrypting personal privacy protocols are mapped with a unique personal identification data associated with a single user. As shown, PID 1, PID 2, PID 3, PID 4, and PID 5 are linked with #P1Key, #P2Key, #P3Key, #P4Key, and #P5Key, respectively. Although only five examples are provided, the key mapping database may include significantly more than five combinations of PID and cryptographic key. Because each key is linked with a unique PID, and the unique PID is known from the encoded digital image, the key retrieval module 132 can locate the specific key needed by filtering the key mapping database by the PID. By way of an example, an encoded digital image has been received by the computing system 120 that includes PID 1. The key retrieval module 132 uses PID 1 to search the key mapping database for the specific key needed to decrypt the encrypted privacy protocol 201a associated with User 1. PID 1 is linked to #P1Key in the key mapping table, and thus the key retrieval module 132 retrieves #P1Key, which is a cryptographic key that is used in combination with another cryptographic key stored in the encrypted database 113 to decrypt only the encrypted personal privacy protocol 201a. #PKey 1 is unique to the encrypted personal privacy protocol 201a, and cannot be used to decrypt another personal privacy protocol (e.g. personal privacy protocol 201b). Conversely, other keys besides #P1Key cannot be used to decrypt personal privacy protocol 201a, which increases a security of the user's privacy configuration and reduces the cybersecurity risk that the user's privacy controls will be altered.

The computing system 120 also includes a decryption module 133. The decryption module 133 includes one or more components of hardware and/or software program code for decrypting the encrypted personal privacy protocol using the first key to obtain a decrypted personal privacy protocol. For instance, the decryption module 133 utilizes the first key retrieved from the key mapping database in combination with the second key stored on the encrypted database 113 alongside each encrypted personal protocols. One the personal privacy protocol is decrypted, the computing system 120 can access the contents of the privacy protocols specifically tailored to a single user.

The computer system 120 also includes a protocol application module 134. The protocol application module 134 includes one or more components of hardware and/or software program code for displaying the digital image on the social media platform 112 based on the decrypted personal privacy protocol. For instance, the protocol application module 134 applies the one or more rules associated with the privacy protocol prior to publishing the digital image on or more social media platforms 112. The protocol application module 134 applies to rules to control privacy of the user and ensure compliance with a privacy protocol uniquely tailored to the user.

Depending on the personal privacy protocol, the protocol application module 134 may alter, modify, augment, etc. the digital image. For instance, if a rule set in the personal privacy protocol is that a user does not wish to be visible in a photograph posted to a particular social media platform, the protocol application module 134 employs blurring techniques to digitally alter the photograph so that an identity of the user is readily discernable from the photograph. If a rule set in the personal privacy protocol is that a user only wants to be shown in black and white photography, the protocol application module 134 applies a filter to the digital image that transforms the color digital image into a black and white digital image. In another example, if a rule is set in the personal privacy protocol that the user does not want to be included in a photograph on social media without a caption, the protocol application module 134 appends the caption to the digital image.

Figure 7:
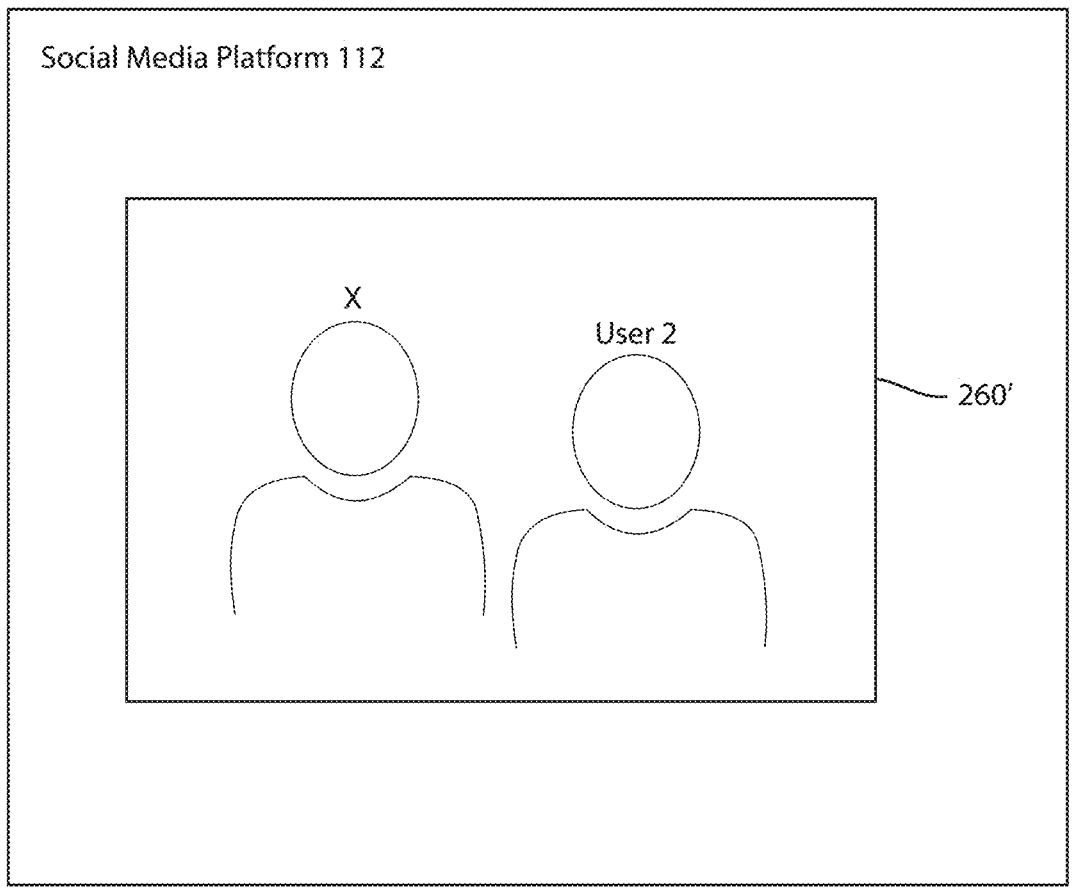
FIG. 7 depicts a schematic diagram of the digital image of FIG. 5 that has been altered as a result of compliance with the personal privacy protocol, in accordance with embodiments of the present invention.

FIG. 7 depicts a schematic diagram of the digital image 260 of FIG. 5 that has been altered as a result of compliance with the personal privacy protocol, in accordance with embodiments of the present invention. The digital image 260' has been altered to remove a name (e.g. User 1) from the digital image 260, when being viewed on a GUI of the social media platform 112. In this example, the user's personal privacy protocol allows photographs with the user to be shared and tagged, but requires that the user's name be masked or otherwise removed when viewing the tagged information.

Moreover, depending on the personal privacy protocol, the protocol application module 134 may alter, modify, augment, etc. the functions, settings, capabilities, and the like, of the social media platform 112. For instance, if a rule set in the personal privacy protocol is that a user does not want to be tagged in any photographs, the protocol application module 134 disables the tagging functionality used to tag the user in a photograph on the social media platforms. If a rule set in the personal privacy protocol is that a user cannot be tagged in a photograph between the months of June and July, the protocol application module 134 checks the metadata of the digital image to determine a date that the digital image was captured, and disables the tagging functionality used to tag the user in the photograph if the date falls within the months of June and July. If a rule set in the personal privacy protocol is that a user does not want to be tagged in a photograph that was captured after a certain time of day, the protocol application module 134 checks the metadata of the digital image to determine a time of day that the digital image was captured, and disables the tagging functionality used to tag the user in the photograph if the time that the photograph was taken falls within the restricted time period. In another example, if a rule in the personal privacy protocol is that a user does not want a photograph to be shared and/or be tagged in the photograph if the photograph was taken at a specific event, the protocol application module 134 checks the metadata of the digital image to determine a time, day, and a geolocation that the digital image was captured and compares the results with a hashtag associated with the event or a calendar event to determine whether the photograph was taken at the event, and disables the tagging functionality used to tag the user in the photograph.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention).

Moreover, embodiments of the privacy control system 100 change an appearance of a GUI using the privacy control application 130. The privacy control system 100 transforms a GUI on a mobile device or other computing device as the digital image is altered. For instance, with the privacy control system 100, a GUI is augmented to comply with a unique personal privacy protocol.

Furthermore, the privacy control system 100 improves privacy control techniques for use with social media. Without using the privacy control system 100, a user cannot control how a digital image that contains the user is shared and tagged on social media. The privacy control system 100 provides a technical solution to the above-drawbacks by cryptographically securing and accessing a personal privacy protocol on an encrypted database. The technical solution(s) described herein is necessarily rooted in computer technology in order to overcome a problem specifically arising in the realm of privacy control across social media platforms. Further, each personal privacy protocol is individually tailored to the user and applied uniquely by the computing system 120 to disable and enable functions of a social media platform. Each user's personal privacy protocol cannot be accessed, changed, altered, deleted, or updated without knowing both cryptographic keys. One of the keys is stored in an encrypted database and the other key is linked with the user mobile device and broadcast to a media capturing device only from the user's phone.

Figure 8:
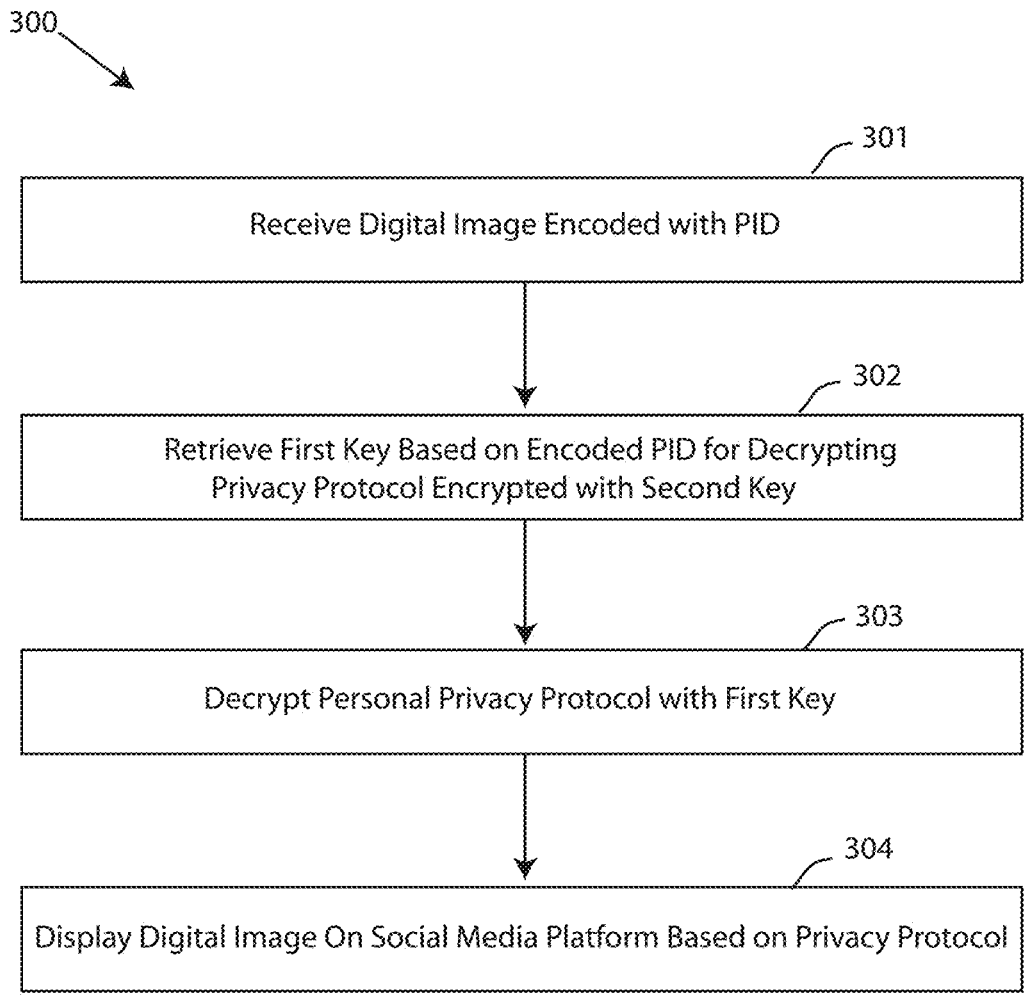
FIG. 8 depicts a flow chart of a method for privacy identity control for sharing media on a social media platform, in accordance with embodiments of the present invention.

Referring now to FIG. 8, which depicts a flow chart of a method 300 for privacy identity control for sharing media on a social media platform, in accordance with embodiments of the present invention. One embodiment of a method 300 or algorithm that may be implemented for privacy identity control for sharing media on a social media platform with the privacy control system 100 described in FIGS. 1-7 using one or more computer systems as defined generically in FIG. 10 below, and more specifically by the specific embodiments of FIG. 1.

Embodiments of the method 300 for privacy identity control for sharing media on a social media platform, in accordance with embodiments of the present invention, may begin at step 301 wherein a digital image is received that is encoded with personal identification data. Step 302 retrieves a first key based on the encoded personal identification data for decrypting a privacy protocol encrypted with a second key. Step 303 decrypts the encrypted personal privacy protocol with the first key. Step 304 displays the digital image on the social media platform based on the personal privacy protocol.

Figure 9:
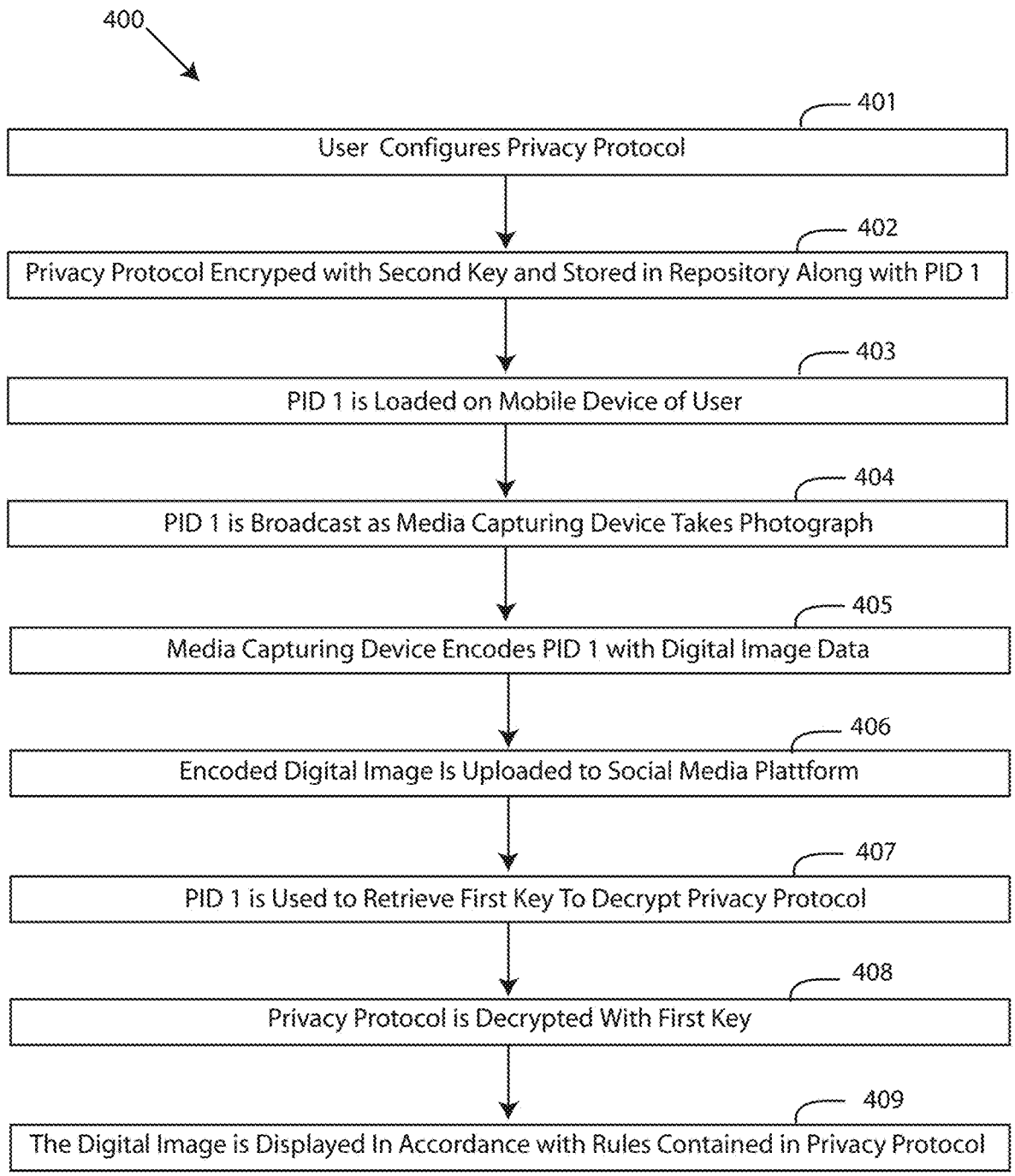
FIG. 9 depicts a more detailed flow chart of a method for privacy identity control for sharing media on a social media platform, in accordance with embodiments of the present invention.

FIG. 9 depicts a more detailed flow chart of a method 400 for privacy identity control for sharing media on a social media platform, in accordance with embodiments of the present invention. At step 401, a user configures a personal privacy protocol. At step 402, the personal privacy protocol is encrypted with the second key and stored in the encrypted database along with personal identification data (e.g. PID 1). At step 403, the personal identification data is loaded on the user mobile device. At step 404, the personal identification data is broadcast as the media capturing device takes a photograph of the user. At step 405, the media capturing device encodes the digital image with the personal identification data. At step 406, a social media user uploads the digital image to the social media platform. At step 407, the personal identification data encoded with the digital image is used to retrieve the first key to decrypt the personal privacy protocol. At step 408, the privacy protocol is decrypted with the first key. At step 409, the digital image is displayed on the social media platform in accordance with the rules contained in the personal privacy protocol.

Figure 10:
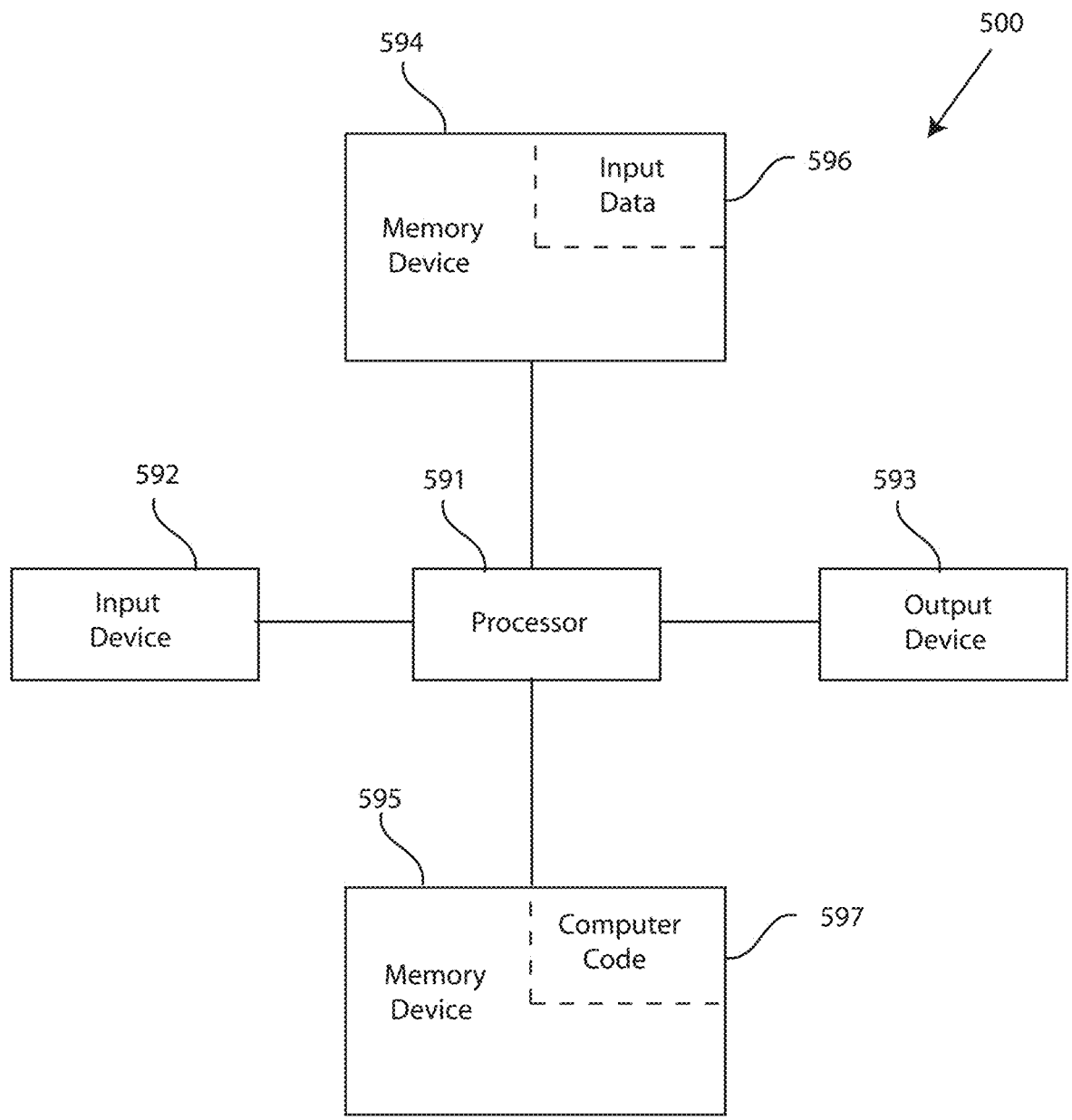
FIG. 10 depicts a block diagram of a computer system for the privacy control system of FIGS. 1-7, capable of implementing methods for privacy identity control for sharing media on a social media platform of FIGS. 8-9, in accordance with embodiments of the present invention.

FIG. 10 depicts a block diagram of a computer system for the privacy control system of FIGS. 1-7, capable of implementing methods for privacy identity control for sharing media on a social media platform of FIGS. 8-9, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for privacy identity control for sharing media on a social media platform in the manner prescribed by the embodiments of FIGS. 8-9 using the privacy control system 100 of FIGS. 1-7, wherein the instructions of the computer code 597 may be executed by processor 591 via memory device 595. The computer code 597 may include software or program instructions that may implement one or more algorithms for implementing the method for privacy identity control for sharing media on a social media platform, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 10.

In some embodiments, the computer system 500 may further be coupled to an Input/Output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to privacy identity control systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to control privacy for sharing media on a social media platform. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for privacy identity control for sharing media on a social media platform. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for privacy identity control for sharing media on a social media platform.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
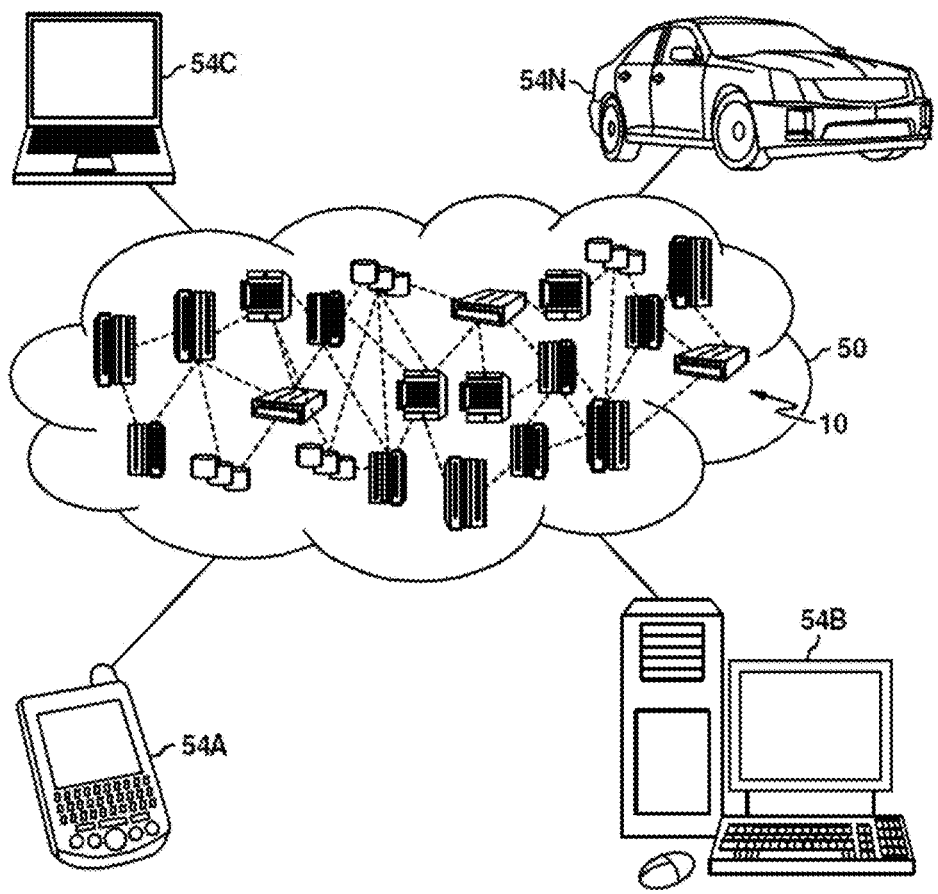
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
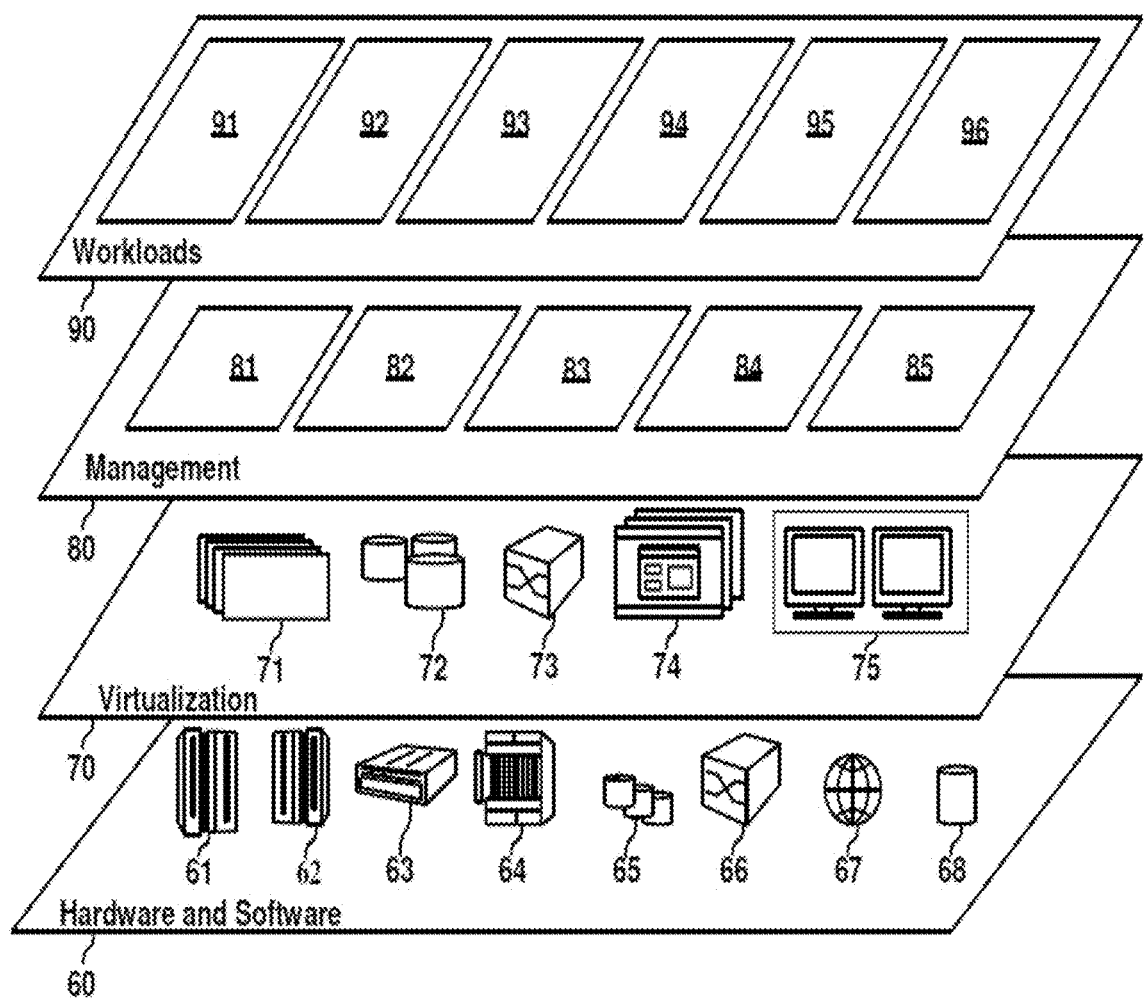
FIG. 12 depicts abstraction model layers, in accordance with embodiments of the present invention.

Referring now to FIG. 12, a set of functional abstraction layers provided by cloud computing environment 50 (see FIG. 11) are shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and social media privacy control 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for privacy identity control for sharing media on a social media platform, the method comprising:
    receiving, by a processor of a computing system, a digital image that is encoded with a privacy identification data from a media capturing device for sharing on the social media platform, wherein an appearance of one or more users in the digital image is unaltered in the digital image as a function of the digital image being encoded with the privacy identification data, the media device being separate from the computing system and coupled to the computing system over a network;
    retrieving, by the processor, a first key based on the privacy identification data for decrypting an encrypted personal privacy protocol, wherein the personal privacy protocol is encrypted using a second key;
    decrypting, by the processor, the encrypted personal privacy protocol using the first key to obtain a decrypted personal privacy protocol; and
    applying, by the processor, the decrypted personal privacy protocol to the digital image to alter the digital image prior to publishing on the social media platform.

2. The method of claim 1, wherein a mobile computing device broadcasts a signal containing the privacy identification data to the media capturing device, which is received by a receiver of the media capturing device as the digital image is captured.

3. The method of claim 2, wherein the digital image is encoded with the privacy identification data by the media capturing device in response to capturing the digital image and receiving the signal containing the privacy identification data.

4. The method of claim 1, wherein the first key is stored on a key mapping database that maps keys with privacy identification data for a plurality of users.

5. The method of claim 1, wherein the encrypted personal privacy protocol is stored on an encrypted database along with the second key, the encrypted database storing encrypted personal privacy protocols for a plurality of users.

6. The method of claim 1, wherein the decrypted personal privacy protocol includes one or more rules configured by a user to govern the displaying of the digital image with respect to the user on the social media platform.

7. The method of claim 1, wherein the one or more rules include at least one of: an approval to be tagged in the digital image, a denial to be tagged in the digital image, a period of time that allows tagging in the digital image, an approval to be tagged at a certain event, a denial to be tagged at the certain event, an approval to be tagged on other social media platforms, and a denial to be tagged on another social media platform.

8. A computing system, comprising:
    a processor;
    a memory device coupled to the processor; and
    a computer readable storage device coupled to the processor, wherein the storage device contains program code executable by the processor via the memory device to implement a method for privacy identity control for sharing media on a social media platform, the method comprising:
        receiving, by a processor of a computing system, a digital image that is encoded with a privacy identification data from a media capturing device for sharing on the social media platform, wherein an appearance of one or more users in the digital image is unaltered in the digital image as a function of the digital image being encoded with the privacy identification data, the media device being separate from the computing system and coupled to the computing system over a network;
        retrieving, by the processor, a first key based on the privacy identification data for decrypting an encrypted personal privacy protocol, wherein the personal privacy protocol is encrypted using a second key;
        decrypting, by the processor, the encrypted personal privacy protocol using the first key to obtain a decrypted personal privacy protocol; and
        applying, by the processor, the decrypted personal privacy protocol to the digital image to alter the digital image prior to publishing on the social media platform.

9. The computing system of claim 8, wherein a mobile computing device broadcasts a signal containing the privacy identification data to the media capturing device, which is received by a receiver of the media capturing device as the digital image is captured.

10. The computing system of claim 9, wherein the digital image is encoded with the privacy identification data by the media capturing device in response to capturing the digital image and receiving the signal containing the privacy identification data.

11. The computing system of claim 8, wherein the first key is stored on a key mapping database that maps keys with privacy identification data for a plurality of users.

12. The computing system of claim 8, wherein the encrypted personal privacy protocol is stored on an encrypted database along with the second key, the encrypted database storing encrypted personal privacy protocols for a plurality of users.

13. The computing system of claim 8, wherein the decrypted personal privacy protocol includes one or more rules configured by a user to govern the displaying of the digital image with respect to the user on the social media platform.

14. The computing system of claim 8, wherein the one or more rules include at least one of: an approval to be tagged in the digital image, a denial to be tagged in the digital image, a period of time that allows tagging in the digital image, an approval to be tagged at a certain event, a denial to be tagged at the certain event, an approval to be tagged on other social media platforms, and a denial to be tagged on another social media platform.

15. A computer program product, comprising a computer readable hardware storage device storing a computer readable program code, the computer readable program code comprising an algorithm that when executed by a computer processor of a computing system implements a method for privacy identity control for sharing media on a social media platform, the method comprising:

receiving, by a processor of a computing system, a digital image that is encoded with a privacy identification data from a media capturing device for sharing on the social media platform, wherein an appearance of one or more users in the digital image is unaltered in the digital image as a function of the digital image being encoded with the privacy identification data, the media device being separate from the computing system and coupled to the computing system over a network;

retrieving, by the processor, a first key based on the privacy identification data for decrypting an encrypted personal privacy protocol, wherein the personal privacy protocol is encrypted using a second key;

decrypting, by the processor, the encrypted personal privacy protocol using the first key to obtain a decrypted personal privacy protocol; and applying, by the processor, the decrypted personal privacy protocol to the digital image to alter the digital image prior to publishing on the social media platform.

16. The computer program product of claim 15, wherein a mobile computing device broadcasts a signal containing the privacy identification data to the media capturing device, which is received by a receiver of the media capturing device as the digital image is captured.

17. The computer program product of claim 16, wherein the digital image is encoded with the privacy identification data by the media capturing device in response to capturing the digital image and receiving the signal containing the privacy identification data.

18. The computer program product of claim 15, wherein the first key is stored on a key mapping database that maps keys with privacy identification data for a plurality of users.

19. The computer program product of claim 15, wherein the encrypted personal privacy protocol is stored on an encrypted database along with the second key, the encrypted database storing encrypted personal privacy protocols for a plurality of users.

20. The computer program product of claim 15, wherein the decrypted personal privacy protocol includes one or more rules configured by a user to govern the displaying of the digital image with respect to the user on the social media platform, the one or more rules include at least one of: an approval to be tagged in the digital image, a denial to be tagged in the digital image, a period of time that allows tagging in the digital image, an approval to be tagged at a certain event, a denial to be tagged at the certain event, an approval to be tagged on other social media platforms, and a denial to be tagged on another social media platform.

* * * * *